United States Patent
Stuple et al.

(10) Patent No.: US 7,370,274 B1
(45) Date of Patent: May 6, 2008

(54) SYSTEM AND METHOD FOR FORMATTING OBJECTS ON A PAGE OF AN ELECTRONIC DOCUMENT BY REFERENCE

(75) Inventors: Stuart Jay Stuple, Carnation, WA (US); Krista Bendig, Seattle, WA (US); Peter Engrav, Seattle, WA (US); Christopher Pratley, Seattle, WA (US); Owen C. Braun, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 10/665,312

(22) Filed: Sep. 18, 2003

(51) Int. Cl.
*G06F 15/00* (2006.01)
*G06F 17/00* (2006.01)

(52) U.S. Cl. ............... 715/530; 715/516; 715/517; 715/532; 345/581

(58) Field of Classification Search ............... 715/530, 715/532, 516–517; 345/581
See application file for complete search history.

(56) References Cited

U.S. PATENT DOCUMENTS

| 6,580,438 | B1 * | 6/2003 | Ichimura et al. ............ 715/732 |
| 2002/0065852 | A1 * | 5/2002 | Hendrickson et al. ...... 707/517 |
| 2003/0014447 | A1 * | 1/2003 | White ........................ 707/530 |
| 2003/0030645 | A1 * | 2/2003 | Ribak et al. ................ 345/581 |
| 2004/0237040 | A1 * | 11/2004 | Malkin et al. .............. 715/526 |

* cited by examiner

*Primary Examiner*—William L. Bashore
(74) *Attorney, Agent, or Firm*—Merchant & Gould

(57) ABSTRACT

A method and system can format objects on a first page of an electronic document being created by applying the formatting from corresponding objects contained in a separate formatting source where these objects have been formatted using the existing tools of the application. In this way, when a page is created that has formatting information that is preferred by a user, subsequent pages can be created by referring to the page that has the preferred formatting information.

12 Claims, 13 Drawing Sheets

SYSTEM AND METHOD FOR FORMATTING OBJECTS ON A PAGE OF AN ELECTRONIC DOCUMENT BY REFERENCE

TECHNICAL FIELD

The present invention relates to formatting objects on a page of an electronic document, and more specifically, it relates to computer-based formatting of objects on a first page of an electronic document by referencing a second page with existing objects having a predefined format.

BACKGROUND OF THE INVENTION

Conventional user interfaces for selecting formatting of objects on a page within an electronic document can be rather complex and not user-friendly. Often, the user interfaces for selecting formatting on a page in an electronic document can include drop-down menus or dialog boxes for various options such as for changing fonts, managing outlines, and adding bulleting or numbering. The dialog boxes are typically designed such that they may include a preview window to display formatting examples prior to applying such formatting to the objects on the page of the electronic document where the formatting that is selected is usually performed by adjusting a collection of settings independent of the object being formatted.

The preview window in the conventional user interfaces is usually very small relative to an entire page in an electronic document. Also, small objects are usually provided in the window as the basis for the preview. For example, for text based objects, a short sentence could form the entire preview for any selected text formatting. Therefore, decisions regarding text formatting must be made on the basis of a sentence of text. But a single sentence of text in one font may look or provide a feel that is entirely different than a paragraph or a page of text with the same font.

In addition to the preview formatting problems of conventional technology, conventional word processing technology does not provide an easy way to track distinct formatting for supporting multiple languages on a form or fixed document. Companies often have offices located in different countries, yet a company may desire to keep the look and feel of their documents uniform. For example, for internal corporate memos, a company may desire to have all offices use the same memo header. However, this same memo header may not be supported in other languages because of the font that is selected for the form or template. As a result, multinational corporations need to create several different templates that are specific to languages of particular offices.

Accordingly, there is a need in the art to simplify the management of forms or templates that can handle multiple languages and fonts. Another need exists in the art to reduce or substantially eliminate forms that are specific to single languages and corresponding fonts.

Another need exists in the art for more efficient management of the formatting of pages in a document. A need exists for a user interface for formatting documents that is easy to use and that can be easily accessed by a user.

SUMMARY OF THE INVENTION

The present invention can comprise a method and system for formatting objects within an electronic document being created by applying formatting from a formatting source. A formatting source can comprise a separate page object within the same document or an entirely separate document that has existing objects with predefined formatting. Such predefined formatting and corresponding objects can include, but are not limited to, text with predefined fonts, font size, font color, bold, italics, numbering, bullets, horizontal and vertical placement relative to the page as well as other objects such as indents and line spacing, alignment for paragraphs and lines within paragraphs, text with fonts connected to language identifiers, graphical objects with predefined formatting, and other like formatting. The objects in the formatting source are formatted using the existing tools of the application and are displayed in full within the formatting source.

In other words, the present invention can format objects of a first page of an electronic document being created by simply referring to objects that were previously created in a formatting source with the formatting having been applied directly to sample objects rather than indirectly through a series of settings In this way and according to one exemplary aspect, when a page is created that has formatting information that is preferred by a user, that page can be used as a formatting source for formatting subsequent pages. Formatting sources can be created such that formatting information can be realized in context of a whole page unlike conventional technology which merely provides only small portions and sometimes only lines of a page for previewing formatting information. Such formatting sources may be as simple as individual characters formatted as desired or as complex as an entire document that may be referred to as a style sheet that includes samples of each object to be formatted.

The method and system can determine the formatting to apply to objects being created, such as text, by comparing the position of the object being inputted to a corresponding position in a formatting source stored in memory such as comparing positions in a new document to levels in a formatting source such as an outline style sheet. Other ways in which the formatting to apply to objects being created can be determined include identifying objects with similar characteristics such as by similar file types for pictures, comparing the context of an object to be formatted by reviewing surrounding objects, or referencing objects in a formatting source having a corresponding name. In all cases, the formatting source has all of the characteristics that are to be applied to the newly created object.

According to one exemplary aspect of the present invention, a first instance of an object in a formatting source can determine the formatting for an entire object in a style sheet stored in memory and a corresponding object in a document being created. For example, a first instance of an object such as a character of text in a style sheet can govern the formatting of text for the entire series of text in both the style sheet and the page being created in an electronic document.

The first instance of an object in a formatting source that includes a style sheet can provide indent information, line spacing information, bullet or numbering information, as well as font information for an entire object in both the style sheet and the page being created. Indent information can comprise how much an object is indented relative to other objects in a document. Indent information can be important for creating outlines that can have specific indents for certain levels in an outline.

The first instance of an object in a formatting source that includes a style sheet can also govern formatting of objects that can comprise graphics such as pictures inputted into a electronic document being created. Specifically, the first instance of an object in a style sheet can control the formatting of graphics in an electronic document being created such as text flow around the graphics, a color transparency of the graphics, horizontal placement of the graphics, and a scaling of the graphics such as an absolute size of the graphics.

The first instance of an object in a style sheet can also provide line spacing information for a level relative to other lines in a document. Specifically, the first object of a first level in a style sheet can be used to determine the spacing of the first level relative to a second level below the first level and relative to a third level above the first level. The first object of the first level in a style sheet can also provide bullet or numbering information such as whether the first level has a bullet or a number and the format for the bullet or number. A level according to the present invention can generally correspond to a line in an electronic document where the electronic document may have several lines that make up the document.

According to another exemplary aspect of the present invention, the font of text inputted into an electronic document can be determined by looking at the language identifier selected for the text being generated. The language identifier is compared to the style sheet in order to identify any matching language identifiers for an object corresponding to the position of the text being inputted into the electronic document. If a match is found between the language identifier of the inputted text and a language identifier for a corresponding object in the style sheet, then the inputted text is formatted according to the font of the matching object of the style sheet.

If a match is not found between the language identifier of the inputted text and a language identifier for a corresponding object in the style sheet, then it is determined if a match exists between the language identifier of the inputted text and a base language identifier for a corresponding object in the style sheet. If a match is found between the language identifier of the inputted text and a base language identifier for a corresponding object in the style sheet, then the inputted text is formatted according to the font of the matching object having the base language identifier in the style sheet. If a match is not found between the language identifier of the inputted text and a base language identifier for a corresponding object in the style sheet, then the inputted text is formatted according to the font of a corresponding object in the style sheet that has a script language in relation to the language identifier of inputted text.

According to another exemplary aspect, elements of an object of a style sheet can be used to control corresponding elements instead of simply the entire object in an electronic document being created. In other words, individual elements within a object are evaluated to determine formatting for corresponding elements in an electronic document being created. For example, if a font change exists within a object on a style sheet (for example, the first word of a sentence is in a different font), then the corresponding element in the electronic document being created can have font change at the same position within the object in the style sheet. The present invention is not limited to font changes and can include other formatting changes; for example, the object can provide indent information, line spacing information, bullet or numbering information for the corresponding level in the electronic document being created as discussed above with respect to the other exemplary aspects.

Similarly, the present invention can control the formatting among different types of objects within the electronic document. Formatting changes between objects include, but are not limited to, spacing between objects, punctuation between objects, special characters between objects such as bullets or numbers or dashes, and other like changes.

DETAILED DESCRIPTION OF THE EXEMPLARY EMBODIMENTS

With the present invention, a page being created in an electronic document can follow the formatting of an existing document or sheet of data. In other words, instead of selecting options for formatting with a user interface in order to create a formatting scheme for a particular electronic document, an existing document that may have preferred formatting information or a preferred formatting scheme can be used to govern the formatting of subsequent new pages in an electronic document.

This page or document that controls formatting of subsequent pages in electronic document may be referred to as a style sheet and it can be changed like any other page in the electronic document so that formatting can be created in the context of an entire page or document. This style sheet of the present invention is unlike conventional formatting techniques that usually only provide previews of formatting information in the context of two or three lines of artificial text. With the present invention, the style sheet can comprise an existing document so that the formatting of the existing document can be reviewed and ascertained in the context of an entire page or multiple pages.

Exemplary Operating Environment

Figure 1:
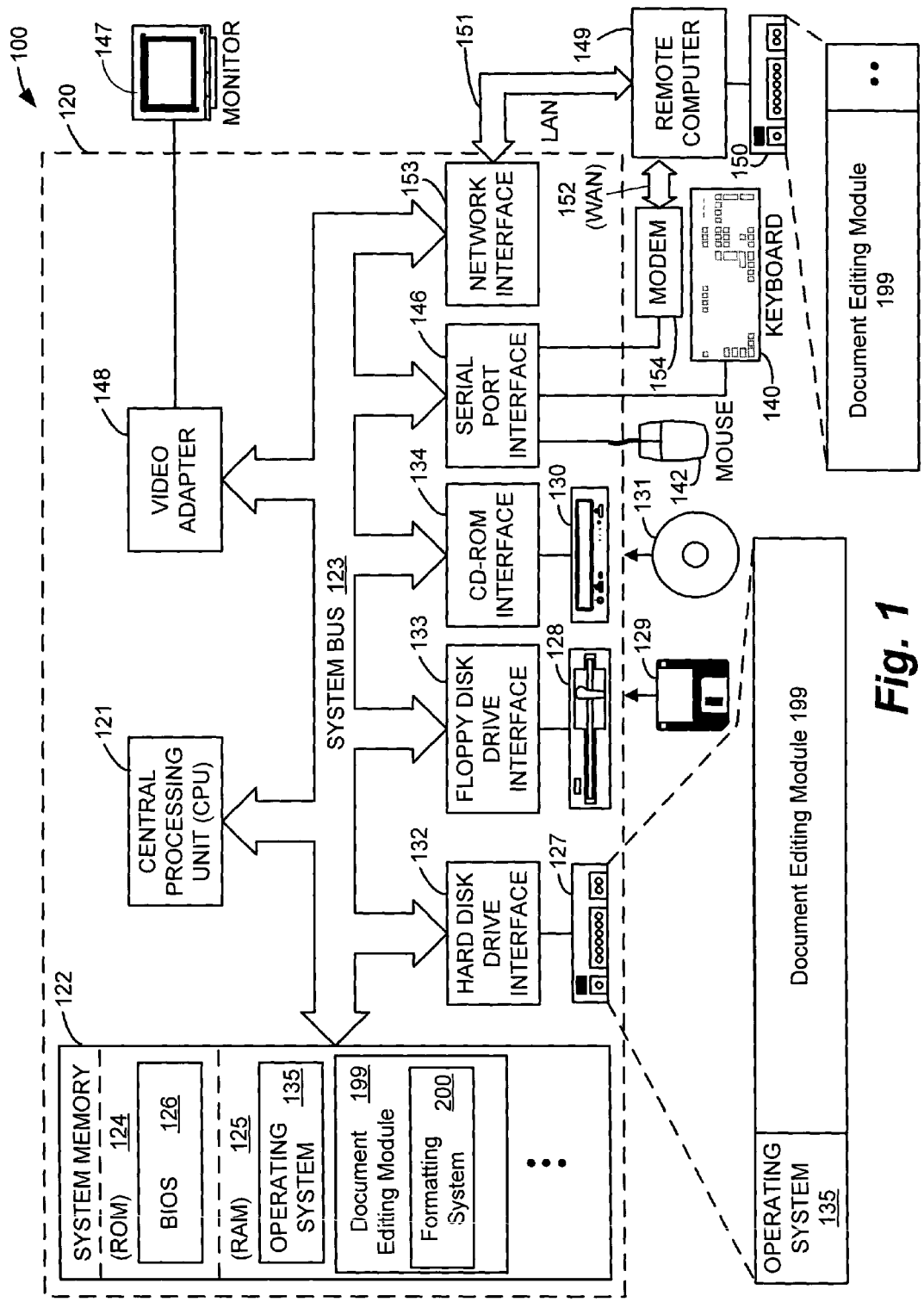
FIG. 1 is a block diagram of a network personal computer that provides the exemplary operating environment for the present invention.

Exemplary embodiments of the present invention will hereinafter be described with reference to the drawings, in which like numerals represent like elements throughout the several figures. FIG. 1 illustrates an exemplary operating environment for implementation of the present invention.

The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, an electronic document editing module 199 comprising a formatting system 200. Program modules can include, but are not limited to, routines, sub-routines, programs, objects, components, data structures, etc., which perform particular tasks or implement particular abstract data types.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Exemplary Architecture of System

Figure 2:
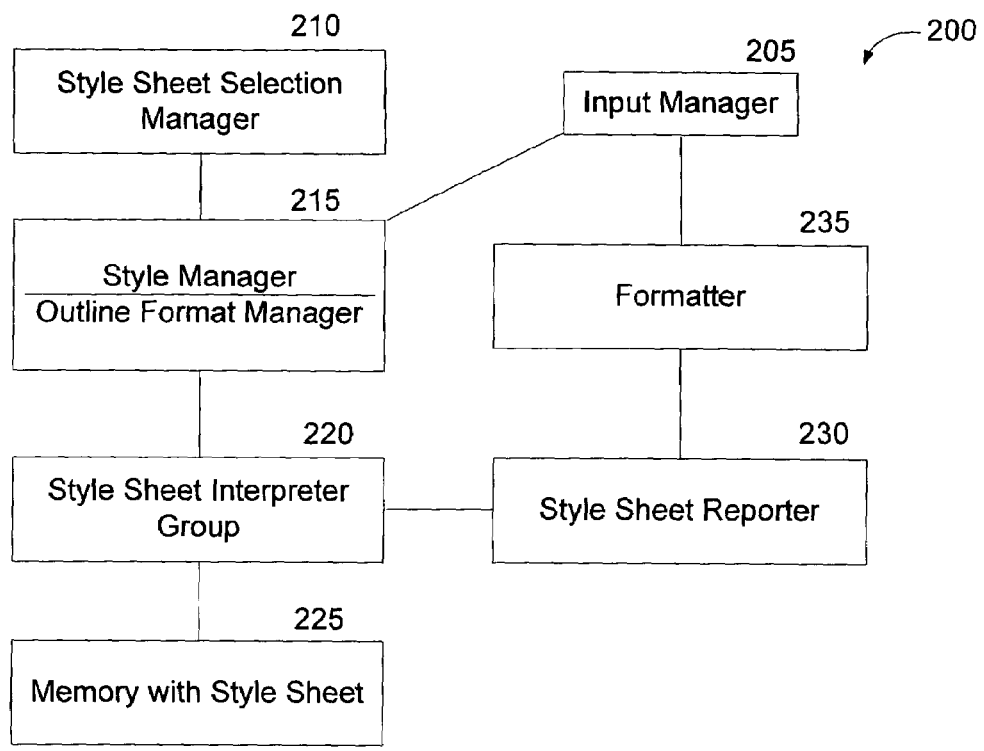
FIG. 2 is a functional block diagram illustrating an exemplary architecture for a formatting system according to one exemplary embodiment of the present invention.

Referring now to FIG. 2, this figure is a functional block diagram of an exemplary formatting system 200 according to one exemplary embodiment of the present invention. The formatting system 200 can comprise an input manager 205, a style sheet selection manager 210, a style manager/outline format manager 215, a style sheet interpreter group 220, a memory 225 with the style sheet, a style sheet reporter 230, and a formatter 235.

The input manager 205 can receive and manage any data that is used to create a new page in an electronic document. The input manager 205 can receive data such as text or graphical objects. The text can be generated with a keyboard or through pasting text from an electronic clipboard. The graphical objects can comprise pictures or drawings that can be presented in any one of well-known graphics formats. For example, the graphical objects can include, but are not limited to, pictures, bitmap objects, device, independent bitmap objects, graphical images formatted as a JPEG or TIFF objects, and other like formats known to those of ordinary skill in the art.

The style manager/outline format manager 215 can track a position of the input received by the input manager 205 on an open or active page being created in an electronic document. The present invention can be embodied in many different application programs. For example, the present invention can be part of a word processing application program. In another embodiment, the present invention can be part of an electronic tablet where handwritten data can be received by the input manager 205.

For those exemplary embodiments in which the present invention is part of a word processing application, the function block 215 is often referred to as the style manager. Meanwhile, for those exemplary embodiments for which the present invention is part of an electronic tablet where handwritten data can be received by the input manager 205, functional block 215 may be referred to as the outline format manager.

In any of the aforementioned scenarios and according to one exemplary embodiment, the style manager/outline format manager 215 can determine if input received by the input manager 205 corresponds to a new level in a style sheet that is controlling the formatting of the page being created in the electronic document. The style manager/outline format manager 215 can calculate the position of the received input in the style sheet.

However, the style manager/outline format manager 215 is not limited to using position information as the association between objects in the style sheet and objects being created in the open or active page. The style manager/outline format manager 215 can use other ways other than comparing levels to associate objects in a formatting source with objects being created in an open or active page. As noted above, the style manager/outline format manager 215 can determine formatting of objects being created by identifying objects with similar characteristics in a formatting source such as by similar file types for pictures, by comparing the context of an object to be formatted by reviewing surrounding objects, or by referencing objects in a formatting source having a corresponding name.

According to one exemplary embodiment, once the style manager/outline format manager 215 determines the position of the input in the page being created relative to a corresponding position in the style sheet, the style sheet interpreter group 220 can determine the format of the input based on the position of the received input and the corresponding object in the style sheet. For example, if the received input corresponds to a new level in the style sheet, the style sheet interpreter group can review the corresponding object in the style sheet to ascertain: the font if the object in the style sheet is text; any language identifiers associated with the object if the object is text; any bullets or numbering associated with the object; any horizontal positioning information relative to other levels of data; and vertical position data relative to other levels of data in the style sheet. Further details of the style sheet interpreter group 220 will be discussed below with respect to FIG. 3.

The style sheet interpreter group 220 can continually review the style sheet that is stored in memory 225. Memory 225 can comprise a cache memory. However, other forms of memory are not beyond the scope of the present invention. Other memory types include, but are not limited to, random access memory, dynamic random access memory, data stored on a read-only memory medium, and data stored writable storage mediums such as a hard disk drive, DVD, CD, or a magnetic floppy disk.

After the style sheet interpreter group 220 identifies the various formatting information associated with the object of the style sheet that corresponds with the position of the received input, the style sheet interpreter group 220 can pass this information on to a style sheet reporter 230. A style sheet reporter 230 can take the formatting information determined by the style sheet interpreter group 220 and pass this information on to the formatter 235. The formatter 235 can apply the formatting information determined by the style sheet interpreter group 220 and modify the received input so that it is displayed with the format of the corresponding object in the style sheet.

Figure 3:
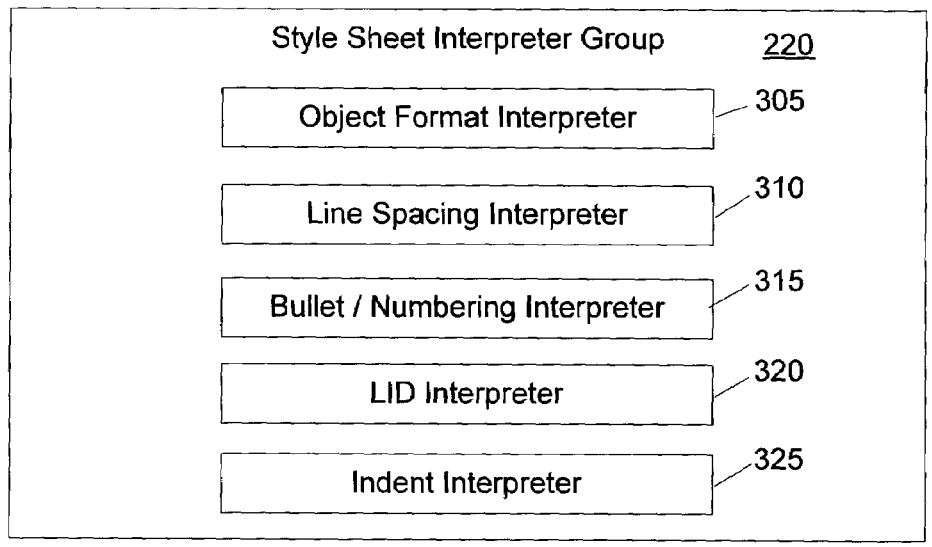
FIG. 3 is a functional block diagram illustrating a style sheet interpreter group according to one exemplary embodiment of the present invention.

Referring now to FIG. 3, this figure is a functional block diagram illustrating the style sheet interpreter group 220 discussed above with respect to FIG. 2. The style sheet interpreter group 220 can comprise an object format interpreter 305, a line spacing interpreter 310, a bullet or numbering interpreter 315, a language identifier (LID) interpreter 320, and an indent interpreter 325. The object format interpreter 305 can determine the format of an object being evaluated in a style sheet.

One or more object format interpreters 305 can exist within the style sheet interpreter group 220. The object format interpreter 305 can ascertain the format of text or graphics or both. For text, the object format interpreter 305 can determine the font of a particular character of text in addition to any other special formatting such as bold, underline, italics, etc.

For graphical based objects, the object format interpreter 305 can determine text flow around the graphical object, a color transparency of the graphical object, a horizontal placement as well as a vertical placement of the graphical object, as well as a scaling of the graphical object. A graphical object can comprise at least one of a picture or a drawing. The formatting realized by the object format interpreter 305 is not limited to the formatting discussed above and can include any other formatting that could be assigned to a particular character of text or a graphical object.

The line spacing interpreter 310 can determine a relative distance for a level of text or a graphical object. In other words, the line spacing interpreter 310 can ascertain a distance between one level relative to other levels within a style sheet. The line spacing interpreter can determine the exact distance between a first level and a second level that may be present above the first level as well as the distance between the first level and a third level that may be positioned beneath the first level.

The bullet or numbering interpreter 315 can determine if a particular level has a bullet or numbering scheme associated with that particular level in the style sheet. The bullet or numbering interpreter 315 can also identify the font for the bullet or numbering associated with a particular level.

The language identifier (LID) interpreter 320 can identify a particular language identifier that may be associated with a level within a style sheet. Further details about the language identifier (LID) interpreter 320 will be discussed below with respect to FIG. 16.

The indent interpreter 325 can determine a horizontal spacing of a level relative to other levels within a style sheet. In other words, the indent interpreter can identify how much to indent a particular level within a style sheet.

While the style sheet interpreter group 220 has been described above for the exemplary embodiment where position information is used to associate objects in a new page with objects in the style sheet, the present invention is not limited to this type of association between objects in the style sheet and objects in the new page. As discussed above, other ways to determine formatting can be employed other than comparing levels to associate objects in a formatting source with objects being created in an open or active page. Formatting of objects being created can be determined by identifying objects with similar characteristics in a formatting source such as by similar file types for pictures, by comparing the context of an object to be formatted by reviewing surrounding objects, or by referencing objects in a formatting source having a corresponding name.

Figure 4:
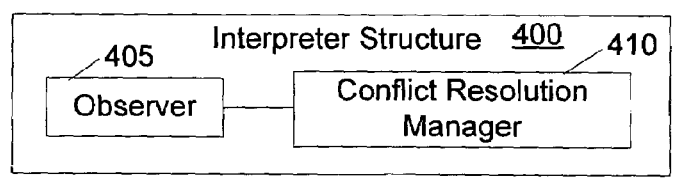
FIG. 4 is a functional block diagram illustrating interpreter subcomponents that form the interpreter group illustrated in FIG. 3 according to one exemplary embodiment of the present invention.

Referring now to FIG. 4, this figure is a functional block diagram illustrating an exemplary structure for each interpreter discussed above with respect to FIG. 3. The interpreter structure 400 can comprise an observer component 405 and a conflict resolution manager component 410. The observer component 405 can review the style sheet and determine the formatting characteristics for a particular character and a level in the style sheet. In some cases, the observer component 405 may detect more than one possible match. In those cases, the conflict resolution manager 410 can review what is observed by the observer component 405 and can apply one or more rules for determining which of the information it needs to report to the style sheet reporter 230 (illustrated in FIG. 2).

The present invention includes multiple computer programs which embody the functions described herein and illustrated in the exemplary display screens and the appended flow chart. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Exemplary Display Screens

The exemplary display screens of FIGS. 5 through 10 and FIGS. 13 through 14 describe the present invention according to the exemplary embodiment where position information is used to associate objects in a new page with objects in the style sheet. However, the present invention is not limited to this type of association between objects in the style sheet and objects in the new page. As discussed above, other ways to determine formatting can be employed other than comparing levels to associate objects in a formatting source with objects being created in an open or active page. Formatting of objects being created can be determined by identifying objects with similar characteristics in a formatting source such as by similar file types for pictures, by comparing the context of an object to be formatted by reviewing surrounding objects, or by referencing objects in a formatting source having a corresponding name.

Figure 5:
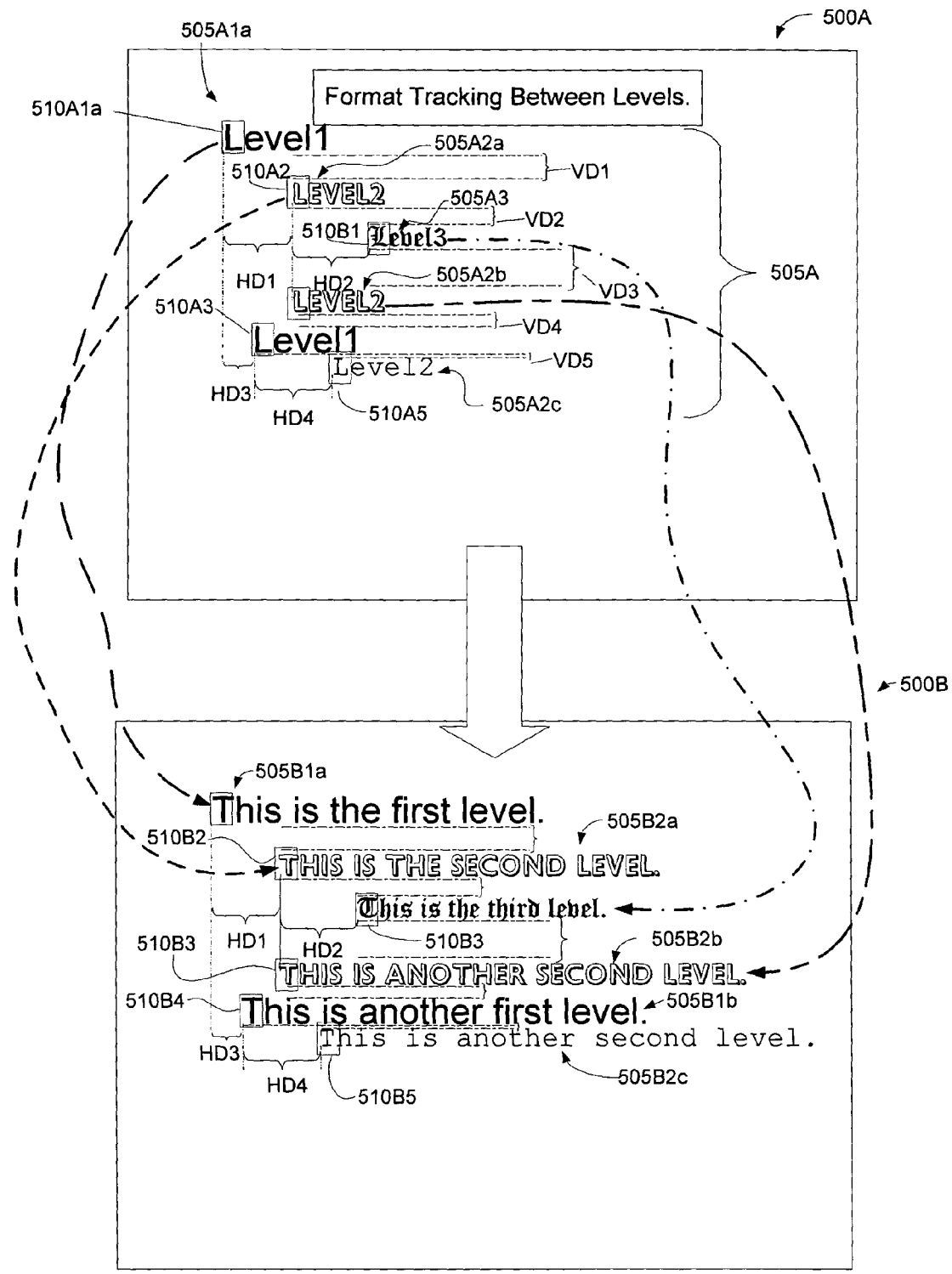
FIG. 5 includes two exemplary display screens illustrating a style sheet depicted above a page being created in an electronic document according to one exemplary embodiment of the present invention.

Referring now to FIG. 5, this figure includes two display screens comprising a style sheet 500A and a page 500B being created in an electronic document. The style sheet 500A can comprise a plurality of levels 505A. A level according to the present invention can generally correspond to a line in an electronic document where the electronic document may have several lines that make up the entire document.

According to the exemplary embodiment illustrated in FIG. 5, a first level 505A1*a* can comprise a line of text with a first font. A second level 505A2*a* can also comprise a line of text having a second font. The first level 505A1*a* can be spaced from the second level 505A2*a* by a first vertical distance VD1. The second level 505A2*a* can be spaced apart from a third level 505A3 by a second vertical distance VD2. The third level 505A3 can comprise a third line of text produced with a third font.

The third level 505A3 can be spaced apart from another second level 505A2*b* by a third vertical distance VD3. The second instance of the second level 505A2*b* can comprise a font that is identical to the first instance of the second level 505A2*a*. The second instance of the second level 505A2*b* can be spaced from a second instance of the first level by a fourth vertical distance VD4.

The second instance of the first level 505A1*b* can also comprise a font that is identical to the first instance of the first level 505A1*a*. The second instance of the first level 505A1*b* can be spaced from a third instance of the second level 505A2*c* by a fifth vertical distance VD5. The third instance of the second level 505A2*c* can comprise a font that is different relative to the first instance of the second level 505A2*a*.

In addition to establishing the vertical distances VD discussed above, the style sheet 500A can also establish the relative horizontal distance between respective levels 505A within the style sheet 500A. For example, the first instance of the first level 505A1*a* can be spaced apart from the first instance of the second level 505A2*a* by a first horizontal distance HD1. The first instance of the second level 505A2*a* can be spaced apart from the third level 505A3 by a horizontal distance HD2.

Similarly, the second instance of the second level of 505A2*b* can be spaced apart from the first instance of the first level 505A1*a* by a horizontal distance HD1. The second instance of the first level 505A1*b* can be spaced apart from the first instance of the first level 505A1*a* by a third horizontal distance HD3. The third instance of the second level 505A2*c* can be spaced apart from the second instance of the first level 505A1*b* by a fourth horizontal distance HD4.

According to one exemplary embodiment of the present invention, the formatting for a particular level of text can be ascertained from a first character 510 of each respective level. The first character 510 of each level can also be used to determine the relative horizontal distances HD between respective levels within the style sheet 500A. However, the present invention is not limited to only evaluating the first character 510 of each respective level 505A. As will be discussed below with respect to FIG. 8, the present invention can also use each character of a level and its respective formatting in order to control the format of a corresponding page being created in an electronic document.

The page 500B being created in the electronic document can comprise several different levels 505B that corresponds with the levels 505A listed in the style sheet 500A. As illustrated in the exemplary page 500B, the font formatting, as well as the vertical and horizontal distances between respective levels is maintained in the exemplary page 500B of the electronic document.

As illustrated, the first character of the first instance of the first level 505A1*a* of the style sheet 500A corresponds with the first character 505B1*a* of the first instance of the first level of the exemplary page 500B. Similarly, the first character 510A2 of the first instance of the second level 505A2*a* of the style sheet 500A corresponds with the first character 510B2 of the first instance of the second level 505B2*a* of the exemplary page 500B of the electronic document. The remaining levels have a similar correspondence between the style sheet 500A and the exemplary page 500B as illustrated with like reference numerals.

Figure 6:
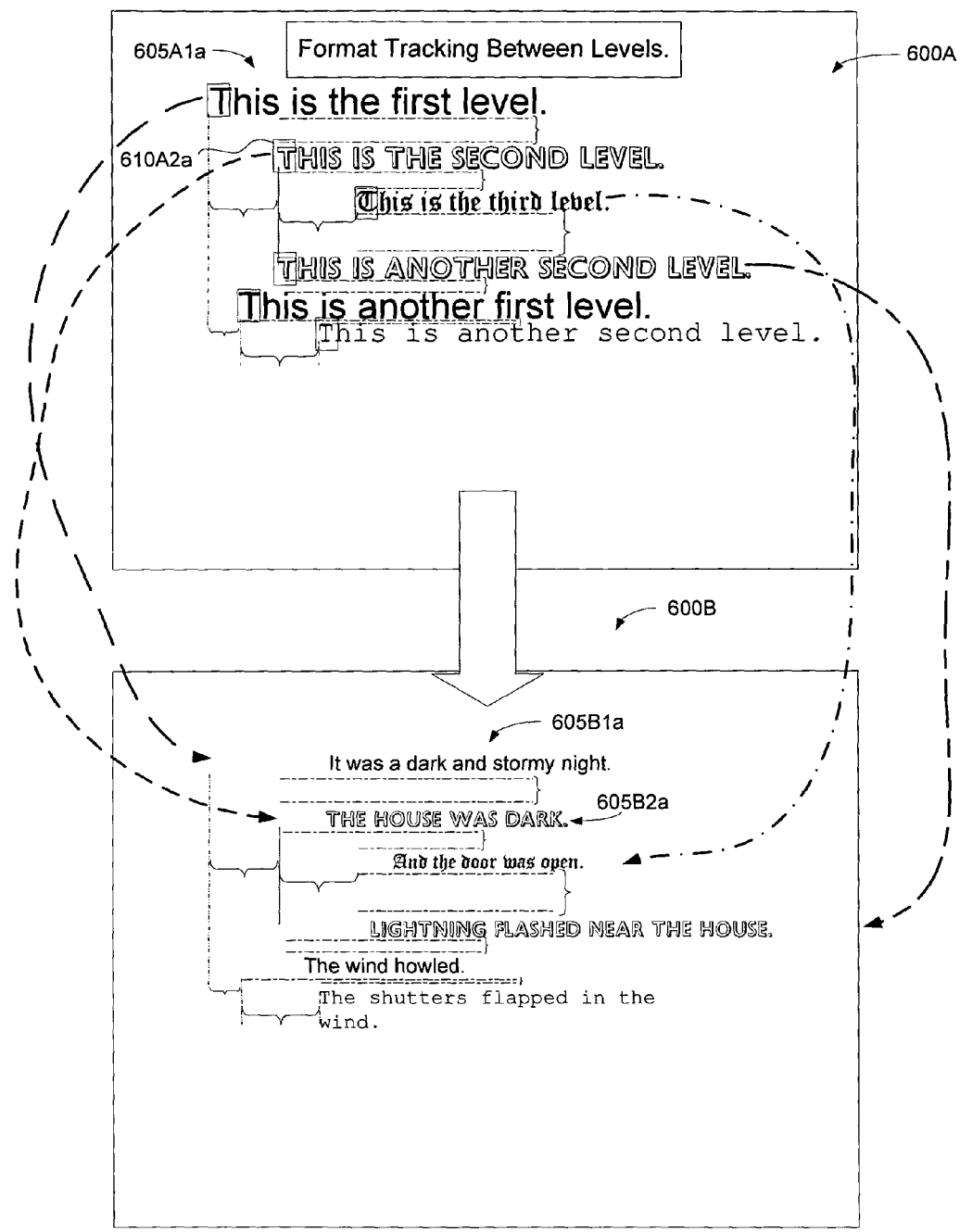
FIG. 6 illustrates two display screens where one display screen is a style sheet comprising a pre-existing document stored in memory depicted above another display screen comprising a page being created in an electronic document according to one exemplary embodiment of the present invention.

Referring now to FIG. 6, this figure illustrates an exemplary style sheet 600A and an exemplary page 600B being created for an electronic document. The style sheet 600A can comprise a preexisting document that has formatting that is preferred by a user. The present invention can ascertain the formatting of the preexisting document that forms the exemplary style sheet 600A and pass this formatting to an exemplary page 600B that is being created for an electronic document. As illustrated, a first character 610A1 of a first instance of a first level in the style sheet 600A can be used to format an entire first level 605B1*a* of an exemplary page 600B being created in an electronic document. Similarly, a first character 610A2 of a first instance of a second level of the exemplary style sheet 600A can be used to format a first instance of a second level 605B2*a* of an exemplary page 600B that is being created in an electronic document.

Figure 7:
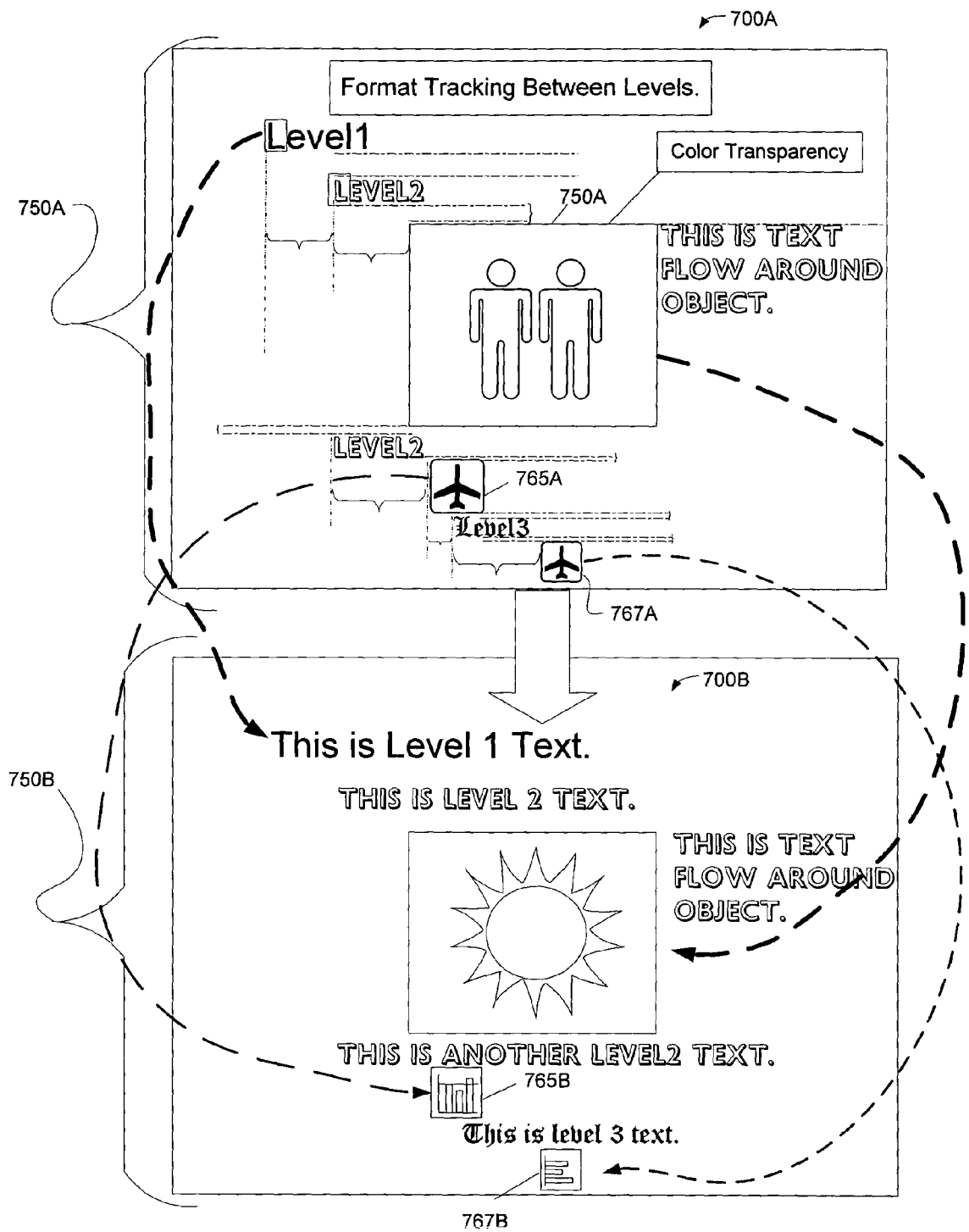
FIG. 7 illustrates two display screens where one display screen is a style sheet comprising graphics formatting depicted above a display screen comprising graphical objects according to one exemplary embodiment of the present invention.

Referring now to FIG. 7, this figure includes two display screens illustrating an exemplary style sheet 700A and a page 700B that is created in an electronic document. The style sheet 700A can comprise multiple levels 705A similar to the multiple levels illustrated in FIGS. 5 and 6. Since FIG. 7 is similar to FIGS. 5 and 6, only the differences between FIG. 7 and FIGS. 5 and 6 will be discussed below.

The style sheet 700A can comprise a graphical object 750A. The graphical object 750A can comprise a digital picture, user generated graphics, and any other like graphical objects. The graphical object 750A can have several properties that can control the formatting of graphical objects that will be created in pages that use the style sheet 700A as their basis for formatting. The graphical object 750A can include formatting properties such as, but not limited to, how text will flow around the graphical object 750A, a colored transparency level of the graphical object 750A, a horizontal placement of the graphical object 750A relative to the entire style sheet 700A, and a scaling of the graphical object 750A such as an absolute size of the graphical object 750A. Other graphical formatting properties are not beyond the scope and spirit of the present invention.

The text 760 adjacent to the graphical object 750A illustrates one exemplary embodiment where text flows around the graphical object 750A when text is added to the style sheet 700A. In other exemplary embodiments (not illustrated), text could flow through the graphical object 750A or be oriented in some predetermined manner relative to the graphical object 750A. Further, text adjacent to the graphical object 750A can be assigned a predetermined font so as not to interfere or take away from the graphical object 750A.

The levels 705A of the style sheet 700A can further include additional graphical objects such as a second graphical object 765A and a third graphical object 770A. As illustrated in FIG. 7, the second graphical object 765A may have a smaller size relative to the first graphical object 750A. However, the second graphical object 765A may have a size which is larger than the third graphical object 770A. The relative sizes of the three graphical objects 750A, 765A, and 770A can control the relative sizes of corresponding graphical objects 750B, 765B, and 770B of the page 700B being created. In this way, the objects of all the levels 705B of the page 700B being created directly correspond with all of the objects of the levels 705A of the style sheet 700A.

Figure 8:
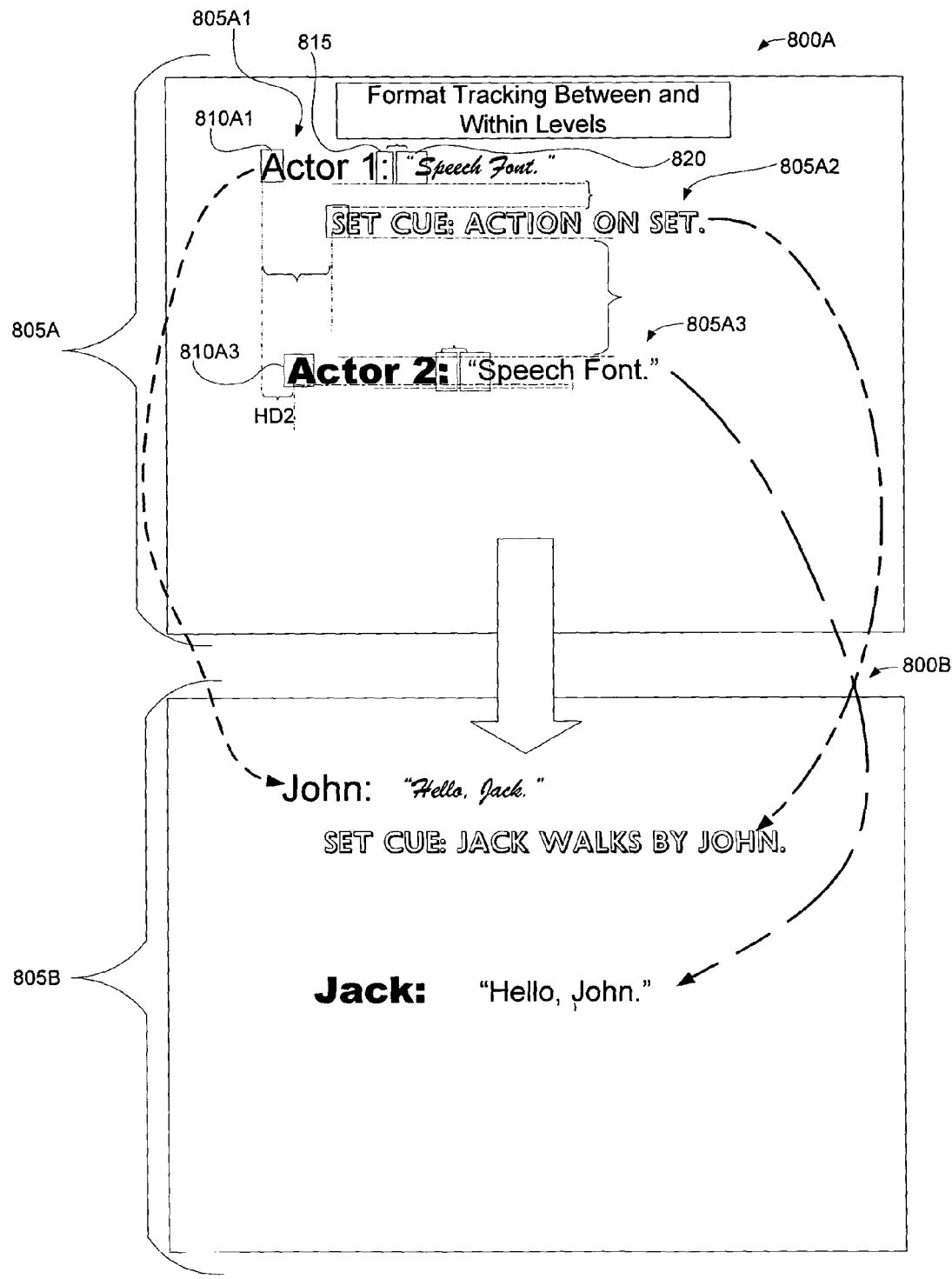
FIG. 8 illustrates two display screens where one display screen comprises a style sheet with predefined formatting between levels and within levels that is depicted above another display screen comprising a page being created in an electronic document according to one exemplary embodiment of the present invention.

Referring now to FIG. 8, this figure includes two display screens illustrating a style sheet 800A and a page 800B being created in an electronic document. The style sheet 800A can comprise multiple levels 805A. The style sheet 800A is similar to the style sheet illustrated in FIGS. 5-7 discussed above. Therefore, only the differences between FIG. 8 and the figures discussed above will be examined.

While the levels 805A of the style sheet 800A have first characters 810A1, 810A2, and 810A3, these lead characters do not control the remaining objects within a particular level. In this exemplary embodiment, each object within a level can be identified for its particular formatting and can be used to control the formatting of corresponding objects in the page 800B being created. For example, in the exemplary style sheet 800A illustrated in FIG. 8, this style sheet may be characterized as a "playwright" style sheet where dialogue between actors and set cues are monitored.

According to this exemplary embodiment, each level may comprise text characters where the first few characters may designate the name of a particular actor. Therefore, every object or character prior to a colon 815 may designate a character's name. These text characters before the colon 815 may include their own formatting such as a specific font.

After the colon 815, there may follow quotations marks 820 that designate that a particular actor may be speaking for a particular scene. The speech that is contained between the quotation marks may have specific formatting such as another font that is different relative to the font identifying the name of the actor who is speaking. Therefore, in this exemplary embodiment illustrated in FIG. 8, formatting within the level is tracked in addition to the formatting between levels as discussed above with FIGS. 5-7.

In the example illustrated in FIG. 8, each actor may have it's own specific font for their speech while the set cues can include a different font that is consistent but different relative to any of the speech of the actors. Further, the set cues can be offset relative to actors speech by a horizontal distance HD1. Those skilled in the art will recognize that the playwright example illustrated in FIG. 8 is just one of numerous exemplary applications for the present invention. The present invention is not limited to the playwright example illustrated and can include other examples that would benefit from tracking the format between and within levels of a style sheet 800A that could control formatting of any page 800B being created in an electronic document.

Figure 9:
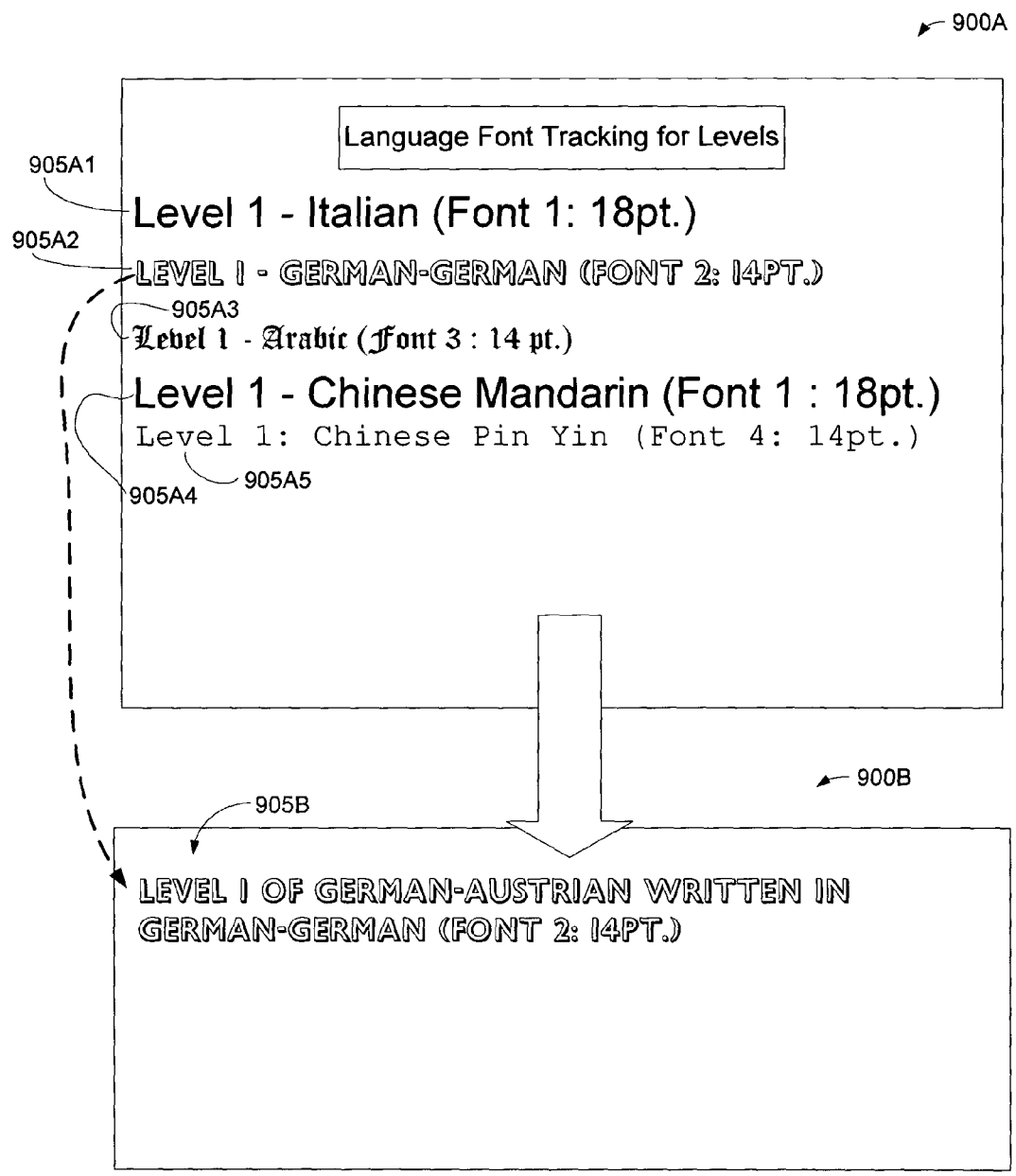
FIG. 9 illustrates two display screens where one display screen comprises a style sheet with language formatting information that is depicted above another display screen comprising a page being created in an electronic document according to one exemplary embodiment of the present invention.

Referring now to FIG. 9, this figure includes two display screens illustrating a style sheet 900A and a page 900B being created in an electronic document. FIG. 9 sets forth an alternative embodiment for the present invention. In the alternative exemplary embodiment illustrated in FIG. 9, a first level 905A is assigned different fonts based upon a language that may be selected in the page 900B. According to this exemplary embodiment, the language identifier can be determined for each language assigned to a particular level.

For example, the first level 905A1 that is assigned the language of Italian can have a first language identifier that is different relative to a second instance of the first level 905A2 that may be assigned the German-German language which also has a unique language identifier. Certain languages selected for a particular style sheet 900A may further be assigned a script language that is shared with other language groups.

For example, the Chinese language may share a common script language for its various dialects. Therefore, Chinese Mandarin and Chinese Pinion dialects may share the common script language of Chinese. Similarly, the English language may share the script language of Latin with the Italian language.

As will be discussed below in further detail with respect to FIG. 16, when a particular language is selected in the page 900B being created, the method and system of the present invention refers to the style sheet 900A to determine if an identical language identifier exists in the style sheet 900A that corresponds to the position or level input that is active in the page 900B being created. If a match is found, then the font assigned to that language identifier is used for that particular level.

However, if an identical language identifier does not exist in the style sheet 900A, then the method and system determines if there is a match with a base language identifier in the style sheet 900A. For example, in the page 900B being created, the language German-Austrian has been selected for a first level of text. The present invention would review the style sheet 900A to determine if there is a matching language identifier that would denote German-Austrian.

However, in the example illustrated in FIG. 9, the language German-Austrian does not exist in the style sheet 900A. Therefore, the present invention would look for a common base language identifier for a related language. In the style sheet 900A, the language German-German would constitute a matching base language identifier relative to the selected German-Austrian language. Therefore, the first level 905B would be written in the font corresponding to the German-German font of the style sheet 900A. As mentioned previously, further details of the language font tracking for levels will be discussed below with respect to FIG. 16.

Figure 10:
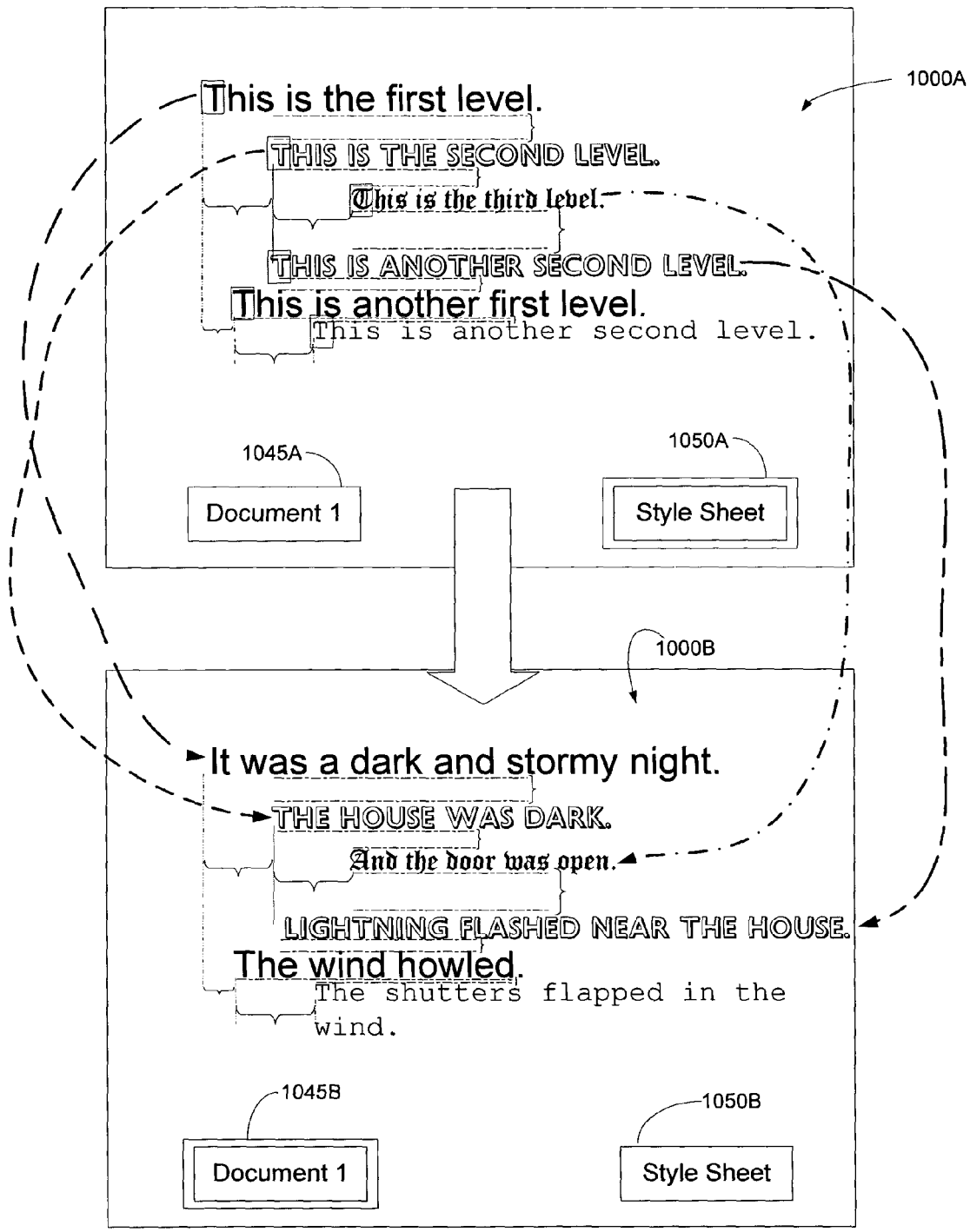
FIG. 10 illustrates two display screens and an exemplary user interface to switch between a first display screen comprising a style sheet and a second display screen comprising a page being created in an electronic document according to one exemplary embodiment of the present invention.

Referring now to FIG. 10, this figure includes exemplary display screens illustrating a style sheet 1000A and a page 1000B being created in an electronic document. The display screens illustrated in FIG. 10 are similar to those illustrated in FIGS. 5-9, and therefore only the differences between these figures will be discussed below. In FIG. 10, an exemplary user interface is illustrated where switching between the style sheet 1000A and the page 1000B that is being created, can be selected without difficulty. A first button 1045 can allow the selection of a document in order to insert data on a page that an be created. A second button 1050 can be selected in order to activate or to view and edit the style sheet 1000A.

In FIG. 10, the button with the double rectangle illustrates which display screen is active. In the exemplary embodiment illustrated in FIG. 10, the button 1050A is active in order to display the style sheet 1000A. Similarly, the first button 1045B is shown active when the page 1000B of the document is being illustrated.

Figure 11:
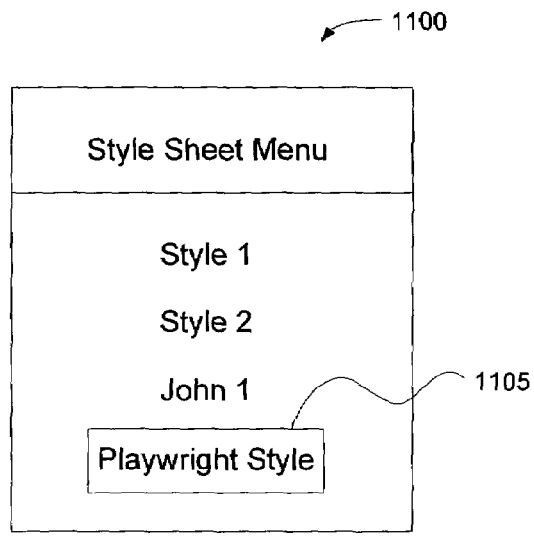
FIG. 11 illustrates a sample user interface for selecting a style sheet according to one exemplary embodiment of the present invention.

Referring now to FIG. 11, this figure illustrates an exemplary user interface 1100 for a word processing application program. The user interface 1100 can comprise a drop-down menu in which various options can be selected such as selecting the playwright style 1105 relative to the other style sheets identified by a name in the drop-down menu 1100. Those skilled in the art will appreciate the present invention is not limited to the user interface 1100 illustrated in FIG. 11 and that other user interfaces that permit selection of different style sheets are not beyond the scope and spirit of the present invention.

Figure 12:
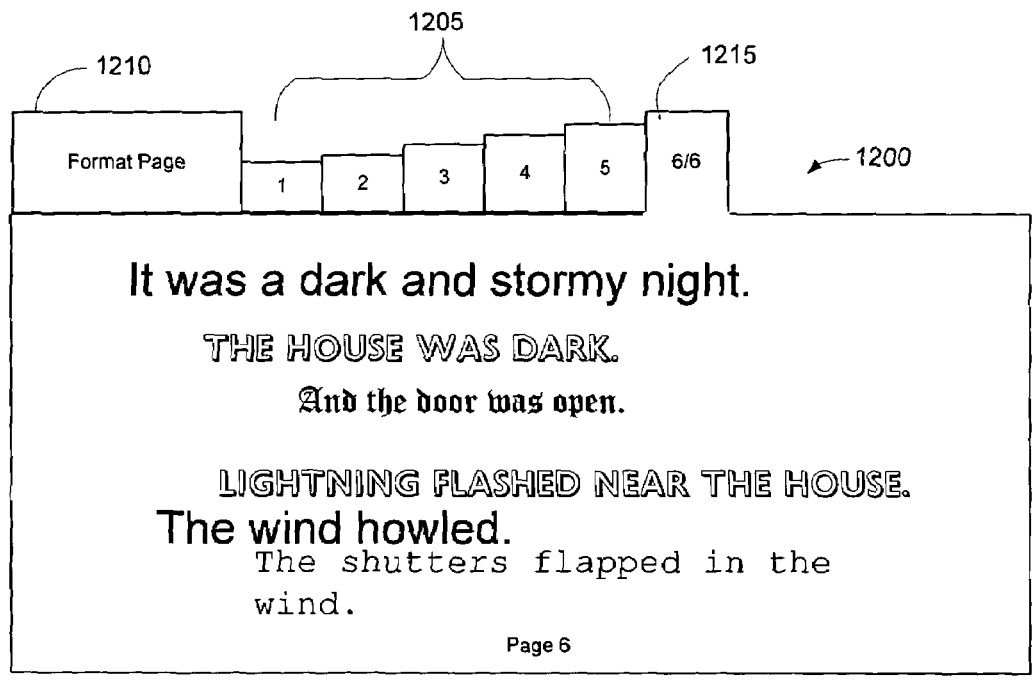
FIG. 12 illustrates yet another sample user interface for electronic tablets according to another exemplary embodiment of the present invention.

Turning now to FIG. 12, this figure illustrates an exemplary user interface for an electronic tablet that may comprise page groupings 1205 that can correspond to a format page 1210 (not illustrated). In the exemplary embodiment illustrated in FIG. 12, a page 1215 that is being created with the electronic tablet is illustrated. Specifically, a sixth page in a series of pages is illustrated in FIG. 12. The format of this sixth page 1215 being created can correspond with a format page 1210 (not illustrated). The format page 1210 (not illustrated) could comprise any one of the style sheets discussed above with respect to FIGS. 5-8.

Figure 13:
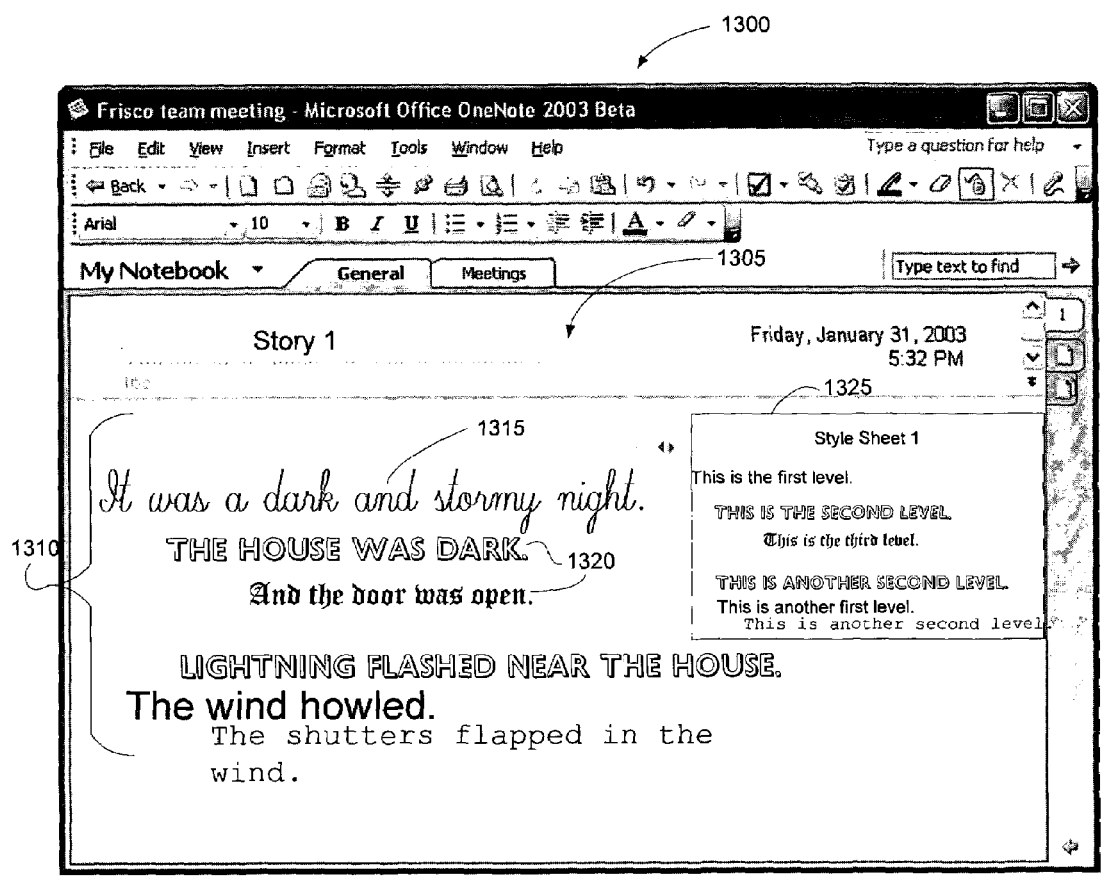
FIG. 13 illustrates a display screen of an electronic tablet that may comprise another exemplary user interface for selecting a style sheet according to alternate exemplary embodiment of the present invention.

Referring now to FIG. 13, this figure illustrates an exemplary display screen 1300 for an electronic tablet. On the active page 1305 of the electronic tablet, objects such as text 1310 can be inputted. The text can comprise handwritten text in the form of electronic ink 1315 or typewritten text 1320 or both. The display 1300 illustrates an alternate exemplary embodiment of a user interface that can comprise a format page 1325 that can be in the form of a reduced sized image such as a thumbnail sized image known to those of ordinary skill in the art.

The format page 1325 can comprise any one of the style sheets discussed above with respect to FIGS. 5 through 8. The format page 1325 can control the formatting of the inputted text 1310. In order to access the format page 1325 to make any modifications, the reduced sized image of the format page 1325 can be activated by using a screen-pointing device such as a mouse pointer in combination with an action such as a "double-click." Those skilled in the art will recognize that the present invention is not limited to the user interface illustrated in FIG. 13 for accessing the format page 1325. Other user interfaces are not beyond the scope and spirit of the present invention.

Figures 14A, 14B, 14C:
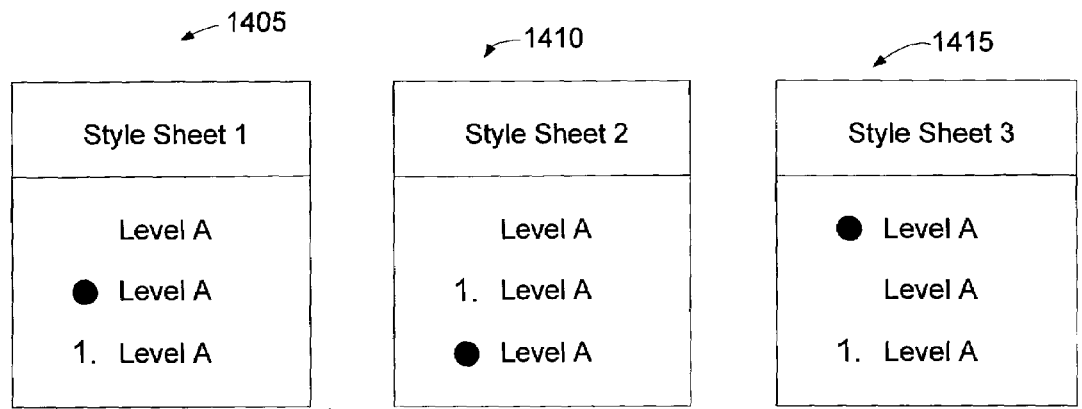
FIGS. 14A-14D illustrate an exemplary user interface for managing bullet and numbering formatting according to one exemplary embodiment of the present invention.

Referring now to FIGS. 14A through 14D, in FIG. 14A, a first exemplary style sheet 1405 is illustrated. The first style sheet 1405 comprises a bullet and numbering scheme where a first level of an outline does not comprise any bullets or numbers. However, for the second level, a bullet is provided, and for the third level, a number is provided.

For the second style sheet 1410, again, the first level does not provide any bullets or numbering. However, the second level of the second style sheet 1410 provides numbering, and the third level of the second style sheet 1410 comprises bullets.

The third style sheet 1415 sets forth a bullet and numbering scheme where the first level comprises bullets, the second level does not comprise bullets or numbering, while the third level comprises numbering.

Figure 14D:
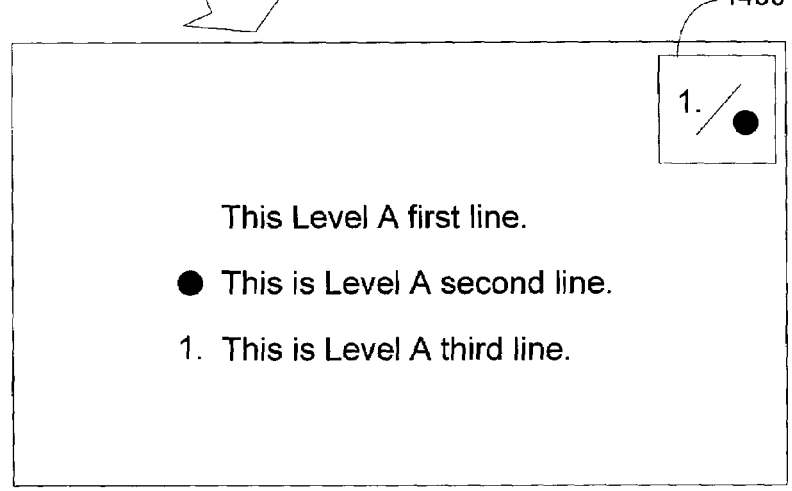

In FIG. 14D, an exemplary page 1425 being created is illustrated. The arrow 1420 from FIGS. 14A to 14D indicates that the first style sheet 1405 has been selected to control the formatting of the exemplary page 1425 being created. In other words, the bullets and numbering scheme of the page 1425 being created mirrors the formatting of the first style sheet 1405. The first level of the page 1425 does not comprise any bullets or numbering, while the second level comprises a bullet and the third level comprises numbering.

FIG. 14D further illustrates a bullet/numbering button then 1430 that can be activated for a particular level in the exemplary page 1425 being created. The button 1430 will cause a particular level to include the numbering or bulleting scheme that corresponds to the style sheet controlling the format of the exemplary page 1425.

For example, when the third level is being created in the exemplary page 1425, when the button 1430 is depressed, the appropriate bullet or numbering scheme is activated in accordance with the style sheet that controls the exemplary page 1425 being created. For the particular example illustrated in FIG. 14D, when the button 1430 is activated for the third level, a numbering scheme is displayed that corresponds with the numbering of the third level of the controlling style sheet 1405. In this way, a single button 1430 can be activated to give the correct formatting for a particular level in an exemplary page 1425 of an electronic document.

Exemplary Process Flow and Method

Figure 15:
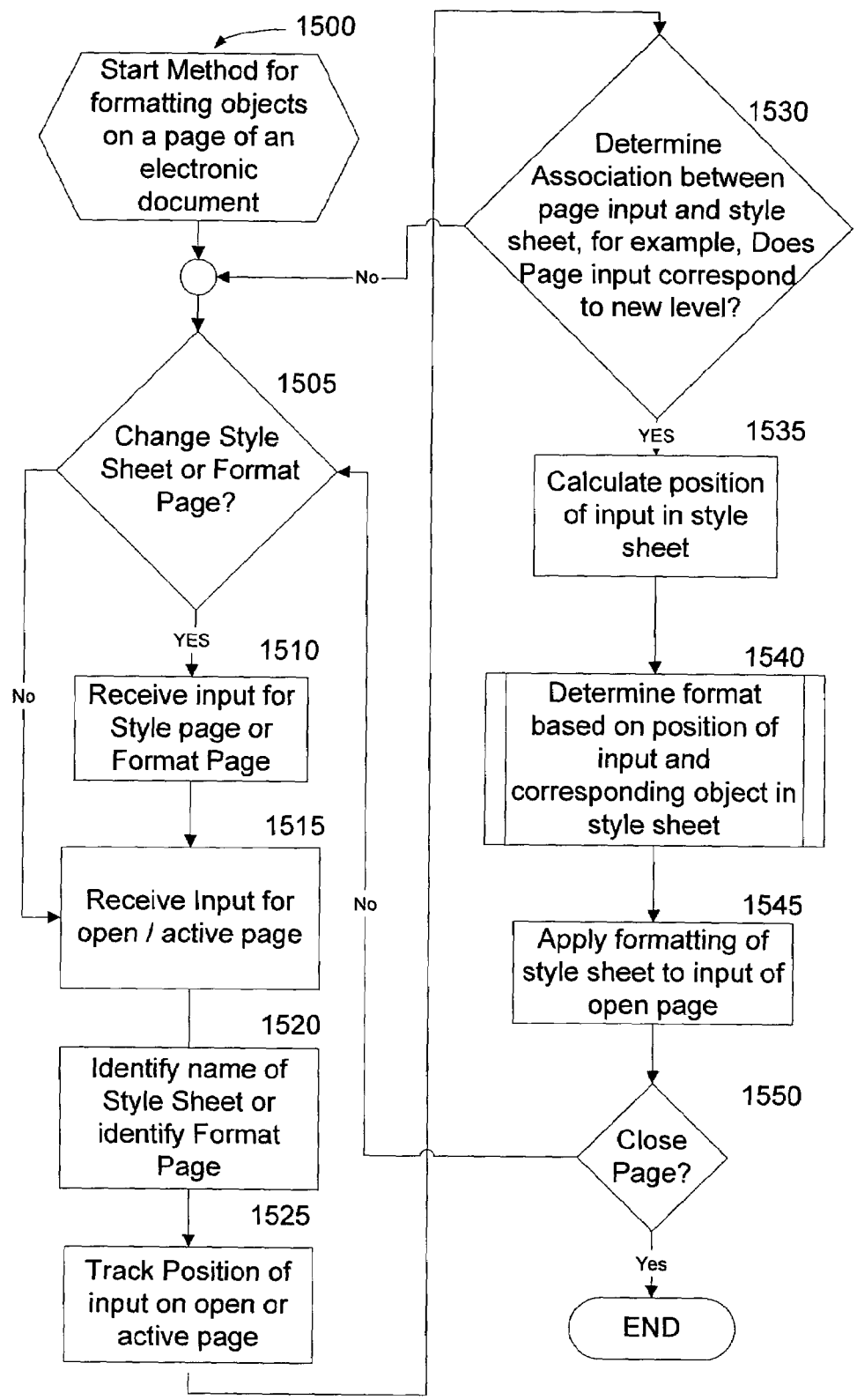
FIG. 15 is a logic flow diagram illustrating an exemplary method for formatting objects on a page of an electronic document according to one exemplary embodiment of the present invention.

Referring now to FIG. 15, this Figure is a logic flow diagram illustrating an overview of an exemplary process 1500 for formatting objects on pages of an electronic document according to one exemplary embodiment of the present invention. Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

The first step in the process 1500 is step 1505 in which the style sheet selection manager 210 can determine if a change in the style sheet or format page is desired. If the inquiry to decision step 1505 is negative, then the "no" branch is followed to step 1515. If the inquiry to decision step 1505 is positive, then the "yes" branch is followed to step 1510 in which input is received for the style page or format page. For example, referring to briefly to FIG. 10, when the style sheet button 1050A is selected, a user can modify the contents of the style sheet 1000A in order to adjust the formatting of the style page 1000A.

In step 1515 input for an open or active page can be received by an input manager 205. Next, in step 1520, a name of the style sheet or format page can be identified and tracked by a style manager or outline format manager 215. Those skilled in the art will recognize that a style manager generally resides in a word processing program application while an outline format manager can reside in a document processing system for an electronic tablet. Usually, only one of the style manager and outline format manager 215 will reside in a particular application program.

In step 1525, the style manager/outline format manager 215 can track a position of the input on the open or active page that is being created. In decision step 1530, the style manager or outline format manager 215 can determine the association between the style sheet and the open or active page that is being created. According to one exemplary embodiment, the style manager or outline format manager 215 can determine if the page input corresponds to a new level in the style sheet.

However, as mentioned above, the style manager/outline format manager 215 is not limited to using position information to determine the association between objects in the style sheet and objects being created in the open or active page. The style manager/outline format manager 215 can use other ways other than comparing levels to associate objects in a formatting source with objects being created in an open or active page. As noted above, the style manager/outline format manager 215 can determine formatting of objects being created by identifying objects with similar characteristics in a formatting source such as by similar file types for pictures, by comparing the context of an object to be formatted by reviewing surrounding objects, or by referencing objects in a formatting source having a corresponding name.

Those skilled in the art will recognize that FIG. 15 has been tailored for the exemplary embodiment where position information is used to associate objects created in the new page with objects in the style sheet. The steps of FIG. 15 could change for the different embodiments discussed above if position information was not used to associate objects created in the new page with objects in the style sheet.

If the inquiry to decision step 1530 is negative, then the "no" branch is followed back to decision step 1505. If the inquiry to decision step 1530 is positive, then the "yes" branch is followed to step 1535 in which a position of the input is calculated in the style sheet. In step 1535, the style manager or outline format manager 215 can calculate an exact position of the input on the active page relative to a style page that controls the formatting for the page being created.

In routine 1540, a format can be determined based on a position of the input on the page being created and the corresponding object in the corresponding level in the style sheet. Basically, the style sheet interpreter group 220 can be reviewing the style sheet and a particular object that corresponds with the position of the input. Further details of routine 1540 with respect to the specific case of language identifiers will be discussed below in the description of FIG. 16. Routine 1540 can be performed by the style sheet interpreter group 220 of FIG. 2.

Next, in step 1545, formatting determined by the style sheet can be applied to the input of the open and active page of the electronic document being created. This step 1545 can be performed by the formatter 235 of FIG. 2. In decision step 1550, it is determined whether the current page that is being created will be closed. If the inquiry to decision step 1550 is negative, then the "no" branch will be followed back to decision step 1530. If the inquiry to decision step 1550 is positive, then the "yes" branch is followed in which the process then ends.

Figure 16:
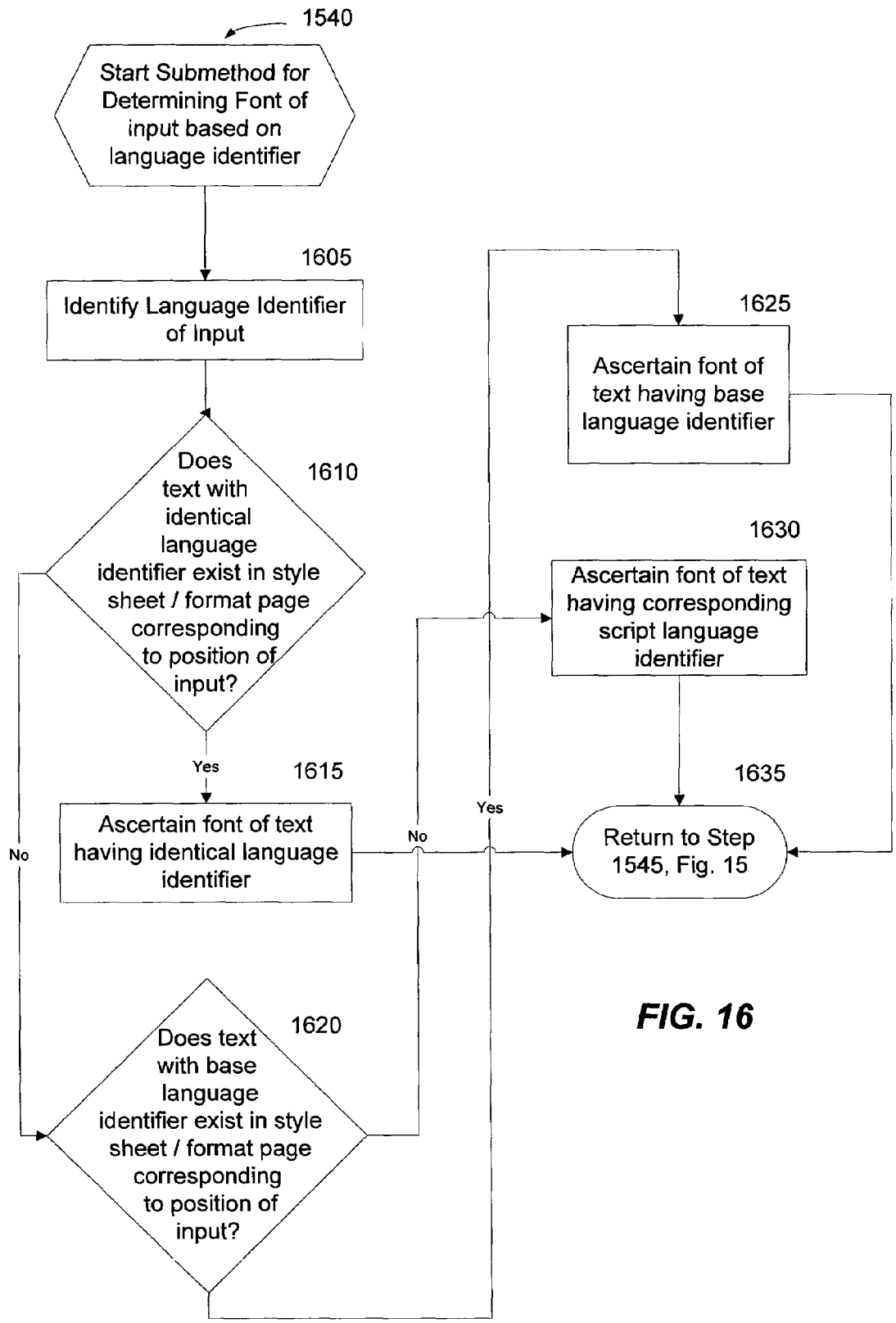
FIG. 16 is a logic flow diagram illustrating a sub-method determining a font of the input for a page being created in an electronic document based language identifiers of the input and a style sheet according to one exemplary embodiment of the present invention.

Referring now to FIG. 16, this figure illustrates an exemplary submethod for determining a font of input for a page being created based on a language identifier. The submethod or routine 1540 starts with step 1605 in which the language identifier of the input of a page being created is identified by a language identifier interpreter 320. Next, in decision step 1610, it is determined if the text with an identical language identifier exists in the style sheet or format page corresponding to the position of the input of the page being created.

If the inquiry to decision step 1610 is negative, then the "no" branch is followed to decision step 1620. If the inquiry to decision step 1610 is positive, then the "yes" branch is followed to step 1615 in which the font of the text having the identical language identifier is ascertained for passing back to the input manager 205. After step 1615, the process then returns to step 1545 of FIG. 15.

In decision step 1620, it is determined if text with a base language identifier exists in the style sheet or format page corresponding to the position of input for the page being created in an electronic document. If the inquiry to decision step 1620 is positive, then the "yes" branch is followed to step 1625 in which the font of the text having the corresponding base language identifier is ascertained in order to pass this information to the input manager 205. After step 1625, the process returns to step 1545 of FIG. 15.

If the inquiry to decision step 1620 is negative, then the "no" branch is followed to step 1630 in which the font of text having a corresponding script language identifier is ascertained for passing to the input manager 205. After step 1630, the submethod or routine 1540 returns to step 1545 of FIG. 15.

Relationship Between FIG. 16 and FIG. 9—Mulitlingual Support

FIG. 16 generally corresponds with the example illustrated in FIG. 9. In FIG. 9, the language selected for a page 900B being created is German-Austrian. However, German-Austrian is not listed in the style sheet 900A. In other words, this means for decision step 1610, the answer to the inquiry of decision 1610 would be negative and the submethod for determining the font of the input would proceed to decision step 1620. While the German-Austrian language is not supported by style sheet 900A, the base language of German-German is supported as illustrated the second instance of the level 1 text 905A2 in style sheet 900A.

Therefore, the inquiry to decision step 1620 would be positive, meaning that the submethod would follow the "yes" branch to step 1625 in which the font of the text having the base language identifier would be ascertained. Referring briefly back to FIG. 9, the German-German font of the second instance of the first level 905A2 would be identified and therefore its font, namely font two, 14 point, would be used for the German-Austrian text being inserted into the page 900B that is being created.

It should be understood that the foregoing relates only to illustrative embodiments of the present invention, and that numerous changes may be made therein without departing from the spirit and scope of the invention as defined by the following claims

What is claimed is:

1. A method to be executed at least in part in a computing device for formatting objects in a page of an electronic document comprising:
receiving a first instance of an object as an input for the page in the electronic document, wherein the page is associated with a style sheet;
receiving formatting information associated with the first instance of the object;
setting formatting parameters for the first instance of the object in the page and in the style sheet based on the received formatting information;
receiving another instance of the object an input for the page in the electronic document;
tracking a position of the other instance of the object relative to the page;
calculating the position of the first instance of the object in the style sheet;
comparing the position of the first instance of the object to the position of the other instance of the object;
determining a format for the other instance of the object based on the position of the first instance of the object in the style sheet; and
applying the format to the other instance of the object, wherein the format includes at least one from a set of: a font, an indent position, a line spacing, a bullet style, a numbering style, a text flow around graphics, a color transparency of graphics, a horizontal placement of graphics, and a scaling of graphics relative to an absolute size of the graphics.

2. The method of claim 1, further comprising receiving input to change the style sheet that controls formatting of the page.

3. The method of claim 1, further comprising determining if the position of the other instance of the object corresponds to a new level in the style sheet.

4. The method of claim 1, further comprising creating the style sheet based on another existing electronic document comprising first instances of objects with preferred formatting.

5. The method of claim 1, further comprising displaying the other instance of the object with the determined format.

6. The method of claim 1, wherein determining the format of the other instance of the object further comprises comparing a language identifier selected for the other instance of the object to existing language identifiers of objects in the style sheet, and determining a font of the other instance of the object based on a corresponding language identifier in the style sheet.

7. The method of claim 1, wherein the style sheet is part of the electronic document.

8. A computer implemented method for controlling page formatting of an electronic document comprising:
receiving a first instance of an object as an input for the page in the electronic document, wherein the page is associated with a style sheet;
receiving formatting information associated with the first instance of the object;
setting formatting parameters for the first instance of the object in the page and in the style sheet based on the received formatting information;
receiving another instance of the object an input for the page in the electronic document;
tracking a position of the other instance of the object relative to the page;
calculating the position of the first instance of the object in the style sheet;
comparing the position of the first instance of the object to the position of the other instance of the object;
determining a format for the other instance of the object based on the position of the first instance of the object in the style sheet, wherein the format for a graphics object includes at least one from a set of: a text flow around graphics, a color transparency of graphics, a horizontal placement of graphics, and a scaling of graphics relative to an absolute size of the graphics, and wherein the format for a text object includes at least one from a set of: a font, an indent position, a line spacing, a paragraph alignment, a bullet style, and a numbering style determined based on a language identifier of the other instance of the object and a corresponding language identifier of the first instance of the object in the style sheet; and applying the format to the other instance of the object.

9. The method of claim 8, further comprising determining the format for the other instance of the object in the page based on the corresponding language identifier of a level in the style sheet.

10. The method of claim 8, further comprising determining the format for the other instance of the object in the page based on the language identifier of the other instance of the object in and a script of a level in the style sheet.

11. A computer system for creating object in an electronic document comprising:
   a processing unit;
   a memory storage device coupled to the processing unit for displaying data; and
   a program module stored in the memory storage device for providing instructions to the processing unit;
   the processing unit responsive to the instructions of the program module operable for
      monitoring a position of an instance of an object within an electronic document;
      comparing the instance of the object to a style sheet for controlling a format of the electronic document based on first instances of one or more objects within the style sheet with predefined formatting wherein a position and a type of a first instance of an object in the style sheet is used to determine a format to be applied to the instance of the object for consistency of the format of the electronic document; and
      formatting the instance of the object within the electronic document in response to identifying the format in the style sheet based on the corresponding position of the identified first instance of the object in the style sheet relative to the position of the instance of the object in the electronic document, wherein the format for the instance of a text object includes at least one from a set of: a font, an indent position, a line spacing, a paragraph alignment, a bullet style, and a numbering style determined based on a language identifier of the instance of the object and a corresponding language identifier of the first instance of the object in the style sheet.

12. The computer system of claim 11, wherein the format for the instance of a graphics object includes at least one from a set of: a text flow around graphics, a color transparency of graphics, a horizontal placement of graphics, and a scaling of graphics relative to an absolute size of the graphics determined based on a language identifier of the instance of the object and a corresponding language identifier of the first instance of the object in the style sheet.

* * * * *